(12) United States Patent
Gu

(10) Patent No.: US 11,652,219 B2
(45) Date of Patent: May 16, 2023

(54) HYBRID BIPOLAR PLATE FOR FUEL CELL

(71) Applicant: Jiangsu Horizon New Energy Technologies CO. LTD., Zhangjiagang (CN)

(72) Inventor: Zhijun Gu, Zhangjiagang (CN)

(73) Assignee: Jiangsu Horizon New Energy Technologies CO. LTD., Zhangjiagang (CN)

( * ) Notice: Subject to any disclaimer, the term of this patent is extended or adjusted under 35 U.S.C. 154(b) by 0 days.

(21) Appl. No.: 16/093,890

(22) PCT Filed: Oct. 10, 2018

(86) PCT No.: PCT/CN2018/109670
§ 371 (c)(1),
(2) Date: Apr. 16, 2020

(87) PCT Pub. No.: WO2020/073238
PCT Pub. Date: Apr. 16, 2020

(65) Prior Publication Data
US 2021/0226227 A1    Jul. 22, 2021

(51) Int. Cl.
*H01M 8/0202* (2016.01)
*H01M 8/0228* (2016.01)
(Continued)

(52) U.S. Cl.
CPC ......... *H01M 8/0228* (2013.01); *H01M 8/021* (2013.01); *H01M 8/026* (2013.01);
(Continued)

(58) Field of Classification Search
None
See application file for complete search history.

(56) References Cited

U.S. PATENT DOCUMENTS 6,974,648 B2    12/2005  Goebel
7,029,784 B2     4/2006  Carlstrom
(Continued)

FOREIGN PATENT DOCUMENTS

WO    2009142994 A1    11/2009

OTHER PUBLICATIONS

Merriam-Webster.com definition of "pillar" (Year: 2022).*

*Primary Examiner* — Lucas J. O'Donnell
(74) *Attorney, Agent, or Firm* — Ward Law Office LLC; Jacob M. Ward

(57) ABSTRACT

A hybrid bipolar plate assembly for a fuel cell includes a formed cathode half plate and a stamped metal anode half plate. The stamped metal anode half plate is nested with and affixed to the formed cathode half plate. Each of the half plates has a reactant side and a coolant side, a feed region, and a header with a plurality of header apertures. The coolant side of the formed cathode half plate has support features that can be different from and need not correspond with cathode flow channels formed on the opposite reactant side. The coolant side of the stamped metal anode half plate has lands corresponding with anode channels formed on the opposite oxidant side. The lands define a plurality of coolant channels on the coolant side of the stamped metal anode half plate and abut the coolant side of the formed cathode half plate.

20 Claims, 6 Drawing Sheets

(51) Int. Cl.
*H01M 8/2483* (2016.01)
*H01M 8/021* (2016.01)
*H01M 8/0213* (2016.01)
*H01M 8/026* (2016.01)
*H01M 8/0267* (2016.01)
*H01M 8/0273* (2016.01)
*H01M 8/04007* (2016.01)
*H01M 8/04701* (2016.01)
*H01M 8/242* (2016.01)

(52) U.S. Cl.
CPC ....... *H01M 8/0213* (2013.01); *H01M 8/0267* (2013.01); *H01M 8/0273* (2013.01); *H01M 8/04067* (2013.01); *H01M 8/04701* (2013.01); *H01M 8/242* (2013.01); *H01M 8/2483* (2016.02)

(56) References Cited

U.S. PATENT DOCUMENTS

| | | |
|---|---|---|
| 7,291,414 B2 | 11/2007 | Goebel et al. |
| 7,687,175 B2 | 3/2010 | Abd Elhamid et al. |
| 8,623,565 B2 * | 1/2014 | Das .................. H01M 8/0271 429/434 |
| 2003/0215692 A1 * | 11/2003 | Rock .................. H01M 8/241 429/514 |
| 2005/0058864 A1 * | 3/2005 | Goebel .............. H01M 8/0254 429/434 |
| 2005/0244700 A1 * | 11/2005 | Abd Elhamid ..... H01M 8/0226 429/480 |
| 2007/0048588 A1 | 3/2007 | Abd Elhamid et al. |
| 2008/0226967 A1 | 9/2008 | Tighe et al. |
| 2009/0092886 A1 * | 4/2009 | Brush ................ H01M 8/0276 429/460 |
| 2014/0329168 A1 | 11/2014 | Dang et al. |

* cited by examiner

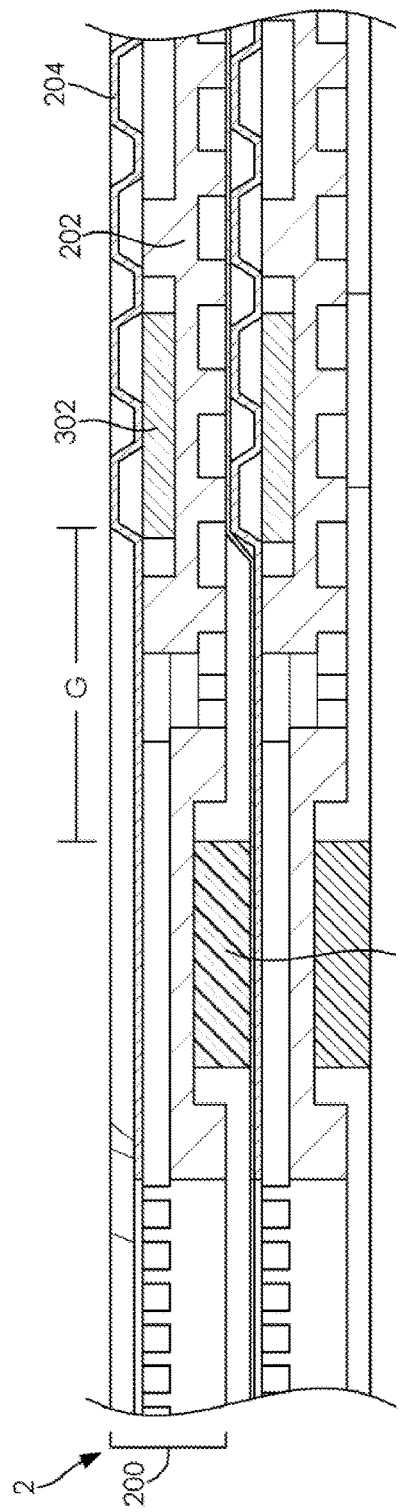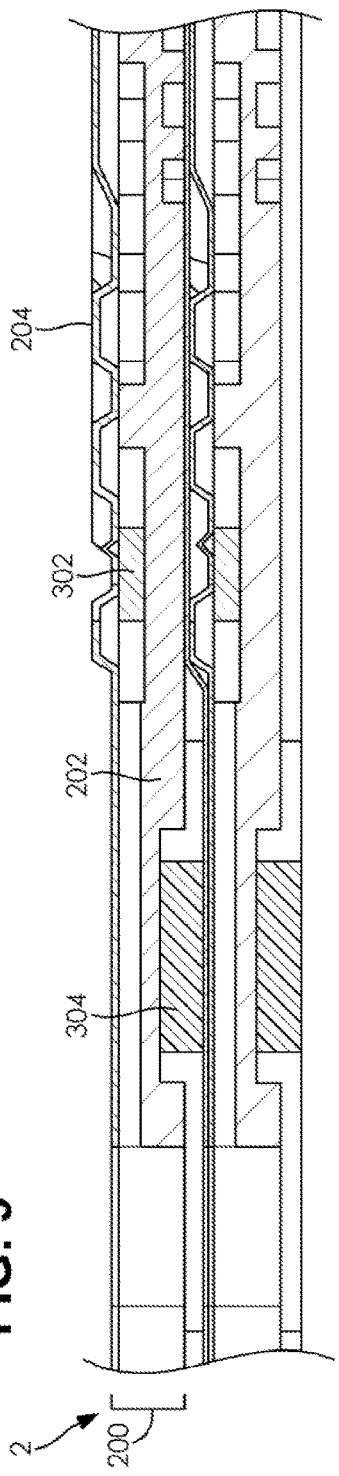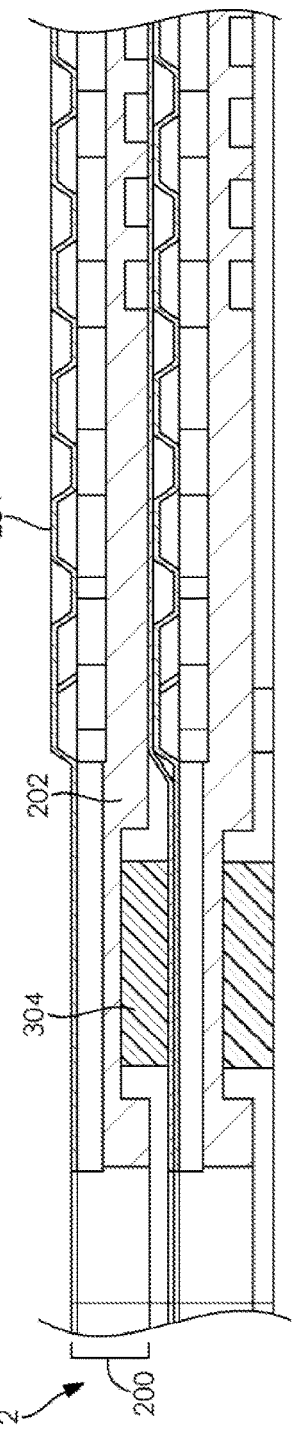

HYBRID BIPOLAR PLATE FOR FUEL CELL

CROSS-REFERENCE TO RELATED APPLICATIONS

This patent application is a United States National Stage Patent Application of International Application No. PCT/CN2018/109670, filed Oct. 10, 2018. The entire disclosure of the above patent application is hereby incorporated herein by reference.

FIELD

The present disclosure relates to fuel cell stacks and, more particularly, to a bipolar plate assembly for fuel cell stacks.

BACKGROUND

A fuel cell has been proposed as a clean, efficient and environmentally responsible power source for various industries, including manufacturing centers, homes, and electric vehicles among other applications.

One example of the fuel cell is a Proton Exchange Membrane (PEM) fuel cell. The PEM fuel cell includes a membrane-electrode-assembly (MEA) that generally has a thin, solid polymer membrane-electrolyte having an anode and a cathode with a catalyst on opposite faces of the membrane-electrolyte. The MEA is generally disposed between a pair of porous conductive materials, also known as gas diffusion media, which distribute gaseous reactants, for example, hydrogen and oxygen or air, to the anode and cathode layers. The hydrogen reactant is introduced at the anode where it reacts electrochemically in the presence of the catalyst to produce electrons and protons. The electrons are conducted from the anode to the cathode through an electrical circuit disposed therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product.

The MEA of the PEM fuel cell is sandwiched between a pair of electrically-conductive bipolar plates which serve as current collectors for the anode and cathode layers. The bipolar plates contain and direct fluids into, within and out of the fuel cell, and distribute fluids to full cell areas necessary for operation. Also, bipolar plates provide structural support for diffusion media, membranes, seals, etc. They furthermore enable sealing from one fuel cell to the next, conduct heat formed by reactions within the fuel cell, and importantly also conduct electricity generated by the fuel cell reactions.

In particular, the bipolar plates include a plurality of lands and flow channels for distributing the gaseous reactants to the anodes and cathodes of the fuel cell. The bipolar plates serve as an electrical conductor between adjacent fuel cells and are further provided with a plurality of internal coolant channels adapted to exchange heat with the fuel cell when a coolant flows therethrough.

A conventional bipolar plate is a joined assembly constructed from two separate unipolar or half plates. Each half plate may have an exterior surface with flow channels for the gaseous reactants and an interior surface with the coolant channels. In order to conduct electrical current between the anodes and cathodes of adjacent fuel cells in the fuel cell stack, the paired half plates forming each bipolar plate assembly are mechanically and electrically joined. For example, such bipolar plates are commonly constructed having the pair of half plates joined by adhesive seal, by brazing, or by welding.

It is known to form bipolar plates from either carbon composite materials or metallic metals. Each approach has advantages and limitations. Nested composites are described in U.S. Pat. No. 7,029,784 to Carlstrom. Nested stamped metal and non-nested composite and stamped metal bipolar plates have been proposed in U.S. Pat. No. 6,974,648 to Goebel, and U.S. Pat. No. 7,687,175 to Abd Elhamid et al., respectively. Feed region support for nested plates has also been described in U.S. Pat. No. 7,291,414 to Goebel. The entire disclosures of these patents are hereby incorporated herein by reference. However, none of these known bipolar plates retain the advantages of combining a formed cathode half plate with a stamped metal anode half plate as disclosed herein.

There is a continuing need for a hybrid bipolar plate assembly that retains the advantages of a formed bipolar plate half and a stamped metal bipolar plate half. Desirably the hybrid bipolar plate assembly is thin but can support very high current densities.

SUMMARY

In concordance with the instant disclosure, a hybrid bipolar plate assembly that retains the advantages of both a formed bipolar plate and a stamped metal bipolar plate, and which is thin but can support very high current densities, is surprisingly discovered.

As used herein, the term "formed half plate" refers to a solid plate half with channels formed therein. The formed half plate is typically formed of a carbon composite material but may also be formed of graphite, graphite filled with resin or even machined or etched metals such as stainless steel or titanium.

As used herein, the term "tunnels" refers to covered channels disposed under a seal to allow fluid (e.g., hydrogen, air or oxygen, and coolant) to flow from and to its respective header of the fuel cell.

As used herein, the term "feed region" refers to a cross-flow region where different fluids (e.g., hydrogen, air or oxygen, and coolant) are flowing in different directions simultaneously during operation of the fuel cell. The feed region is needed in order to distribute flows from individual headers to a full width of a nested active area of the fuel cell.

As used herein, the term "active area" refers to an area of the fuel cell where are necessary components for the fuel cell operation are available, namely, hydrogen, air or oxygen, coolant, polymer electrolyte membrane, catalyst, electrical conductor (e.g., diffusion media), and electrical contact (e.g., all necessary components under compression). Feed regions of nested plates are not considered to be in the active area.

As used herein, the term "nested area" refers to a unique aspect of stamped designs within the counter-flow active area region, where a stamped metal anode half plate fits into a back of a formed cathode half plate. In a non-aligned feed region, as the fuel cell repeat distance is very small, and space is not available for all channels without removing diffusion media from this region. In a nested plate design, the nest area and the active area may coincide, and the feed region is non-active as diffusion media is removed from this region.

As used herein, the term "membrane seal" refers to an entire perimeter of the fuel cell plate and headers where all three fluids (i.e., hydrogen, air or oxygen, and coolant) are blocked from leaking overboard or from the headers at the interface to the membrane.

As used herein, the term "plate seal" refers to an entire perimeter of the fuel cell plate and reactants headers where all three fluids (i.e. hydrogen, air or oxygen, and coolant) are blocked from leaking overboard or from the headers at the interface between plate halves or half plates of the hybrid bipolar plate assembly.

In an exemplary embodiment, a hybrid bipolar plate assembly for a fuel cell includes a formed cathode half plate and a stamped metal anode half plate. The formed cathode half plate has a reactant side and a coolant side, which are independent from each other. The reactant side of the cathode half plate may have fine pitch channels in an active area, feed channels to cathode headers, port holes to cathode tunnels, and a seal gland around the perimeter and each of the headers. The reactant side of the cathode half plate has tunnels for all three fluids (i.e. reactant, oxygen or air, and coolant), with port holes from the cathode tunnels, and a feed region with support features such as an array of pillars and either an open pocket to nest with the stamped metal anode half plate or support ribs aligned into every other stamped coolant channel.

The stamped metal anode half plate has a fuel side and a coolant side. The stamped metal anode half plate further a flat perimeter in a sealing region, a bead feature along a coolant seal, port holes to anode tunnels, branched feed channels and straight channels through an active area with an elevation change from feed to active area channels to nest into the back of the composite cathode half plate.

Further, a membrane seal may be provided that is elastomeric and runs around a perimeter of the bipolar plate and each of the headers. The plate seal follows a same perimeter path but is more inboard in front of the reactant headers and is not needed in front of the coolant header. This plate seal may be elastomeric, compressible graphite, or epoxy, as non-limiting examples. The plate seal is narrower in front of the anode header to allow tunnel flow to the anode ports. Alternatively, a wider support region may be used. The location of the diffusion media does not extend into the feed regions, in order to allow space for the stamped channels to un-nest in the feed regions. The feed region may further employ a membrane support shim.

In one embodiment, a hybrid bipolar plate assembly for a fuel cell includes a formed cathode half plate and a stamped metal anode half plate. The stamped metal anode half plate is nested with and affixed to the formed cathode half plate. The formed cathode half plate has a reactant side and a coolant side, a feed region, and a header with a plurality of header apertures. The reactant side has an active area. The active area has a plurality of cathode channels formed therein. The feed region is disposed between the active area and the header and has a plurality of feed channels formed therein. The feed region also has a plurality of cathode port holes formed therethrough. The feed channels are in communication with the cathode channels and the cathode port holes. The coolant side has a coolant distribution area disposed opposite the active area, and support features disposed opposite at least one of the feed region and the active area. At least a portion of the coolant distribution area can be different from and need not correspond with the cathode flow channels of the active area.

The stamped metal anode half plate has a fuel side and a coolant side, a feed region, and a header with a plurality of header apertures. The fuel side has an active area. The active area has a plurality of anode channels formed therein. The feed region is disposed between the active area and the header and has a plurality of feed channels formed therein. The feed region also has a plurality of anode port holes formed therethrough. The feed channels are in communication with the anode channels and the anode port holes. The coolant side has a plurality of lands corresponding with the anode channels. The lands define a plurality of coolant channels on the coolant side of the stamped metal anode half plate. The plurality of lands abut the coolant side of the formed cathode half plate.

In another embodiment, the formed cathode half plate is formed from graphite, and the cathode channels of the formed cathode half plate have a pitch of about 1.5 mm or less. This particular fine pitch is believed to facilitate a very high current density, for example, of 1.5 to 2.5 A/cm$^2$. The support features on the coolant side of the composite cathode half plate include a plurality of pillars extending outwardly from the coolant side of the composite cathode half plate. The composite cathode half plate has a thickness of between about 0.3 mm and about 1 mm.

Additionally, the stamped metal anode half plate can be formed from stainless steel or titanium and has a sealing region with a planar perimeter flange. The plurality of anode channels formed in the stamped metal anode half plate include a plurality of branched feed channels in the feed region of the stamped metal anode half plate and a plurality of linear flow channels oriented along the active area of the stamped metal anode half plate. The stamped metal anode half plate has a thickness that is less than the thickness of the composite cathode half plate. In particular, the thickness of the stamped metal anode half plate may be between about 0.25 mm and about 0.55 mm.

In a further embodiment, a fuel cell stack having the hybrid bipolar plate assembly includes a plurality of membrane electrode assemblies arranged in a stacked configuration. Each of the membrane electrode assemblies has a polymer electrolyte membrane with a cathode and an anode and associated diffusion medium layers. The hybrid bipolar plate assembly is disposed between adjacent membrane electrode assemblies. The membrane electrode assemblies may further include a membrane seal and the hybrid bipolar plate assemblies may include a plate seal. The plate seal is disposed between the formed cathode half plate and the stamped metal anode half plate. The membrane seal and the plate seal are overlaid and together circumscribe one of the diffusion medium layers. A perimeter edge of the one of the diffusion medium layers is furthermore spaced apart from each of the membrane seal and the plate seal.

The membrane seal may be formed from an elastomer and disposed around a perimeter of the bipolar plate assembly and each of the header apertures. The membrane seal may also be a weld joint if the composite is selected to be a metal material. The plate seal may be formed from one of an elastomer, a compressible graphite, and an epoxy material, and is also disposed around the perimeter of the bipolar plate assembly. A portion of the plate seal adjacent one of the header apertures for the anode may also be thinner than a corresponding portion of the membrane seal adjacent the one of the header apertures for the anode. This arrangement permits tunnel flow to the anode port holes of the hybrid bipolar plate assembly of the fuel cell stack.

It should be appreciated that the formed plates of the present disclosure can provide smaller or very fine channel features because they are not limited by the known "metal stretch" of stamped plates. This is particularly advantageous for reducing land width on the cathode to improve performance. However, composite plates also usually require thicker webs of, for example, about 0.3-0.5 mm. This can undesirably affect the fuel cell thickness, thus increasing the stack height and thereby limiting the number of cells which can be packed within space limited applications such as automotive. Nonetheless, it has been realized that formed plates do provide design flexibility because different channel patterns can be used on each side of the plate. In contrast, for stamped metal plates, the negative image of the channel pattern is found on the opposite side of the half plate.

This ability to customize channel patterns in formed plates is particularly advantageous in the tunnel and feed regions of the plates. For tunnels, channels are desired on the inside of the plate, while a smooth surface for sealing is required on the other side of the plate. Stamped plates require the use of staggered seals in the tunnel region, which require additional plate area. In the feed regions, the fluid must flow in different directions to distribute the fluid to and from the respective headers. This limitation is particularly challenging for the coolant flow of stamped metal plates because the coolant pattern is a result of the cathode and anode patterns of on the opposite side of each plate half.

Composite materials also provide reduced contact resistance and do not necessarily require a contact coating such as gold, which is commonly used on stamped metal plates. Graphite versions of composite plates provide better in-plane thermal conductivity to support higher current densities and wider coolant channel spacing. Permeation of coolant occurs through composite materials but not for metal. Water-glycol coolant is typically used for applications exposed to sub 0° C. temperatures. However, the glycol of such water-glycol coolants can undesirably hinder catalytic reactions. This is less of an issue for the cathode side where the supplied air or oxygen can oxidize the glycol. By using a metal plate half on the anode side, the permeation of glycol to the anode can be avoided where it would be more problematic.

For formed plates, the plate halves are also typically bonded together by epoxy while metal plates are welded together. The joint between the formed and metal plate halves requires a different approach such as an elastomeric seal, compressed graphite or compatible epoxy formulation, as described herein. It is also desired to use thin metal for the stamped plate half to reduce cost and weight; however, the stamped plate needs to have adequate mechanical strength (i.e., adequate thickness) to support the compression loads need to reduce contact resistance within the fuel cell stack.

It has been surprisingly discovered that by combining a formed plate with a stamped plate, the advantages of the formed plate can be retained. The stamped plate half provides a reduction in bipolar plate thickness and further, by nesting the stamped plate into the composite plate, a substantial reduction in bipolar plate thickness can be achieved. Providing support ribs on the coolant side of the formed plate half into every other coolant channel of the stamped plate half also allows the use of thinner metal for the stamped plate half.

DRAWINGS

The above, as well as other advantages of the present disclosure, will become readily apparent to those skilled in the art from the following detailed description, particularly when considered in the light of the drawings described herein.

Figure 2:
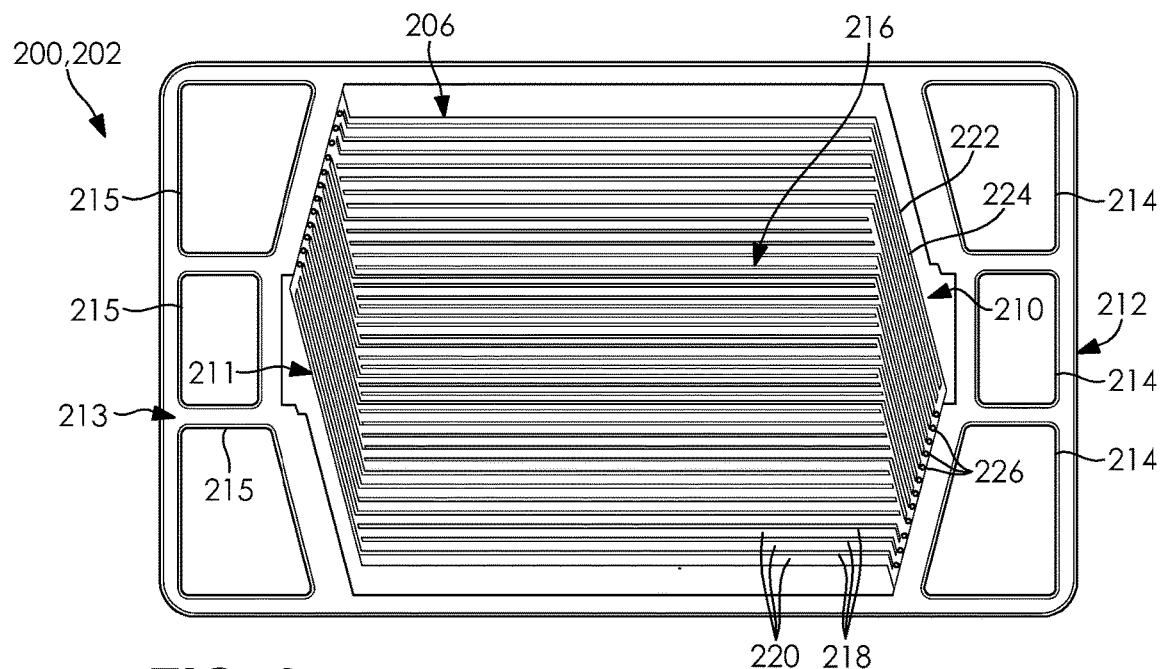
FIG. 2 is a top plan view of a formed cathode half plate for use in the bipolar plate assembly of FIG. 1, and further illustrating a reactant side of the formed cathode half plate.
Figure 3:
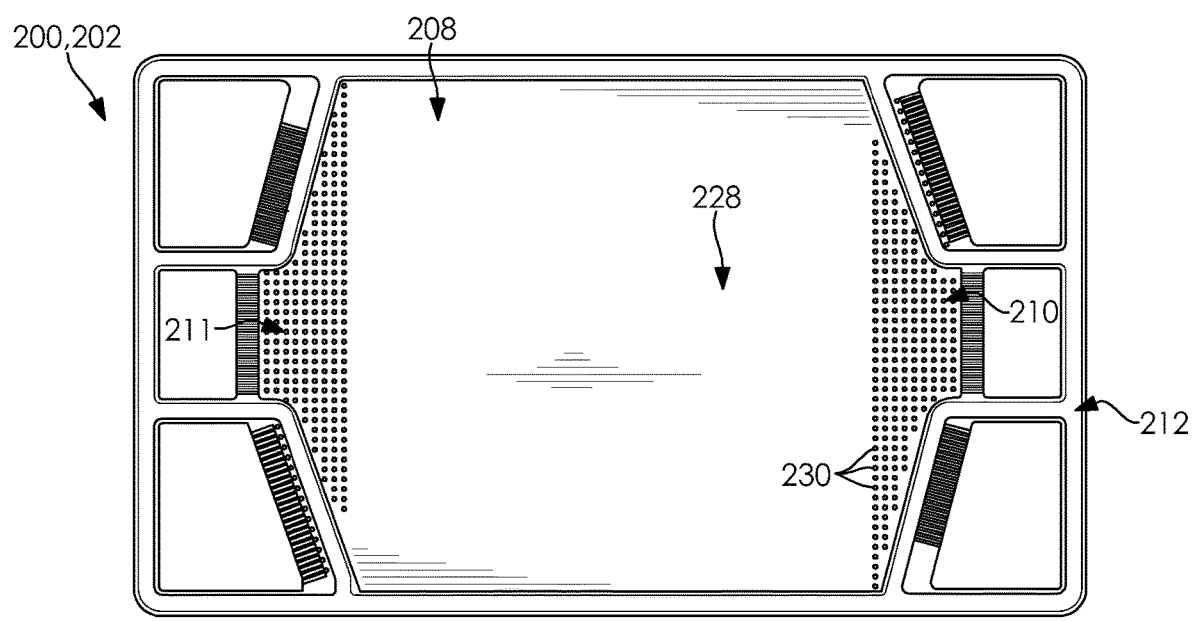
FIG. 3 is a bottom plan view of the formed cathode half plate shown in FIG. 2, according to one embodiment of the disclosure, and further illustrating a coolant side of the formed cathode half plate with an array of pillars in feed regions of the half plate and an empty pocket between the feed regions of the half plate.
Figure 4:
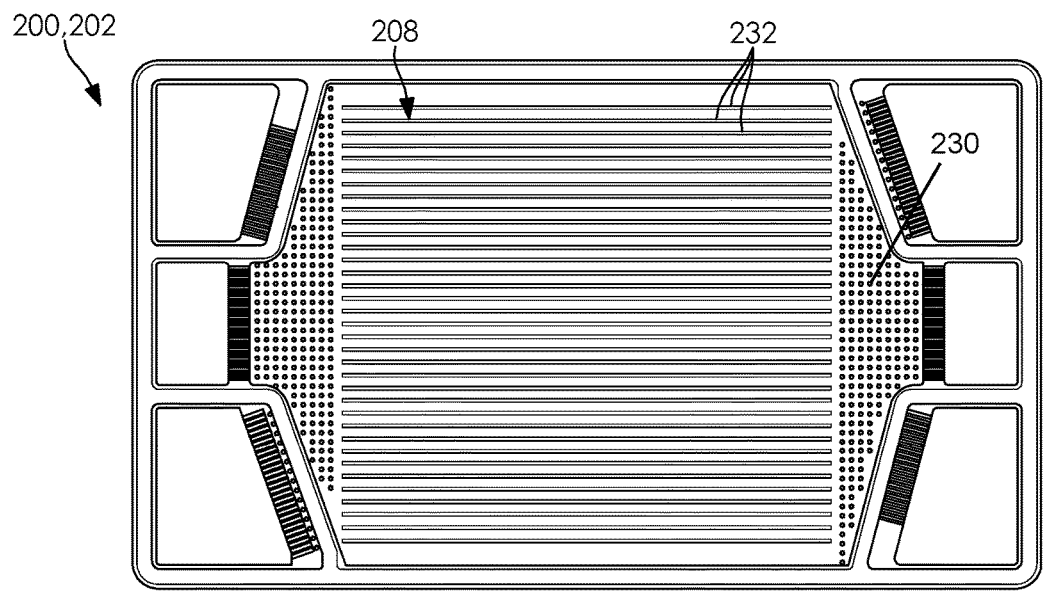
FIG. 4 is a bottom plan view of the formed cathode half plate shown in FIG. 2, according to another embodiment of the disclosure, and further illustrating a coolant side of the formed cathode half plate with coolant channel support ribs between feed regions of the half plate.
Figure 5:
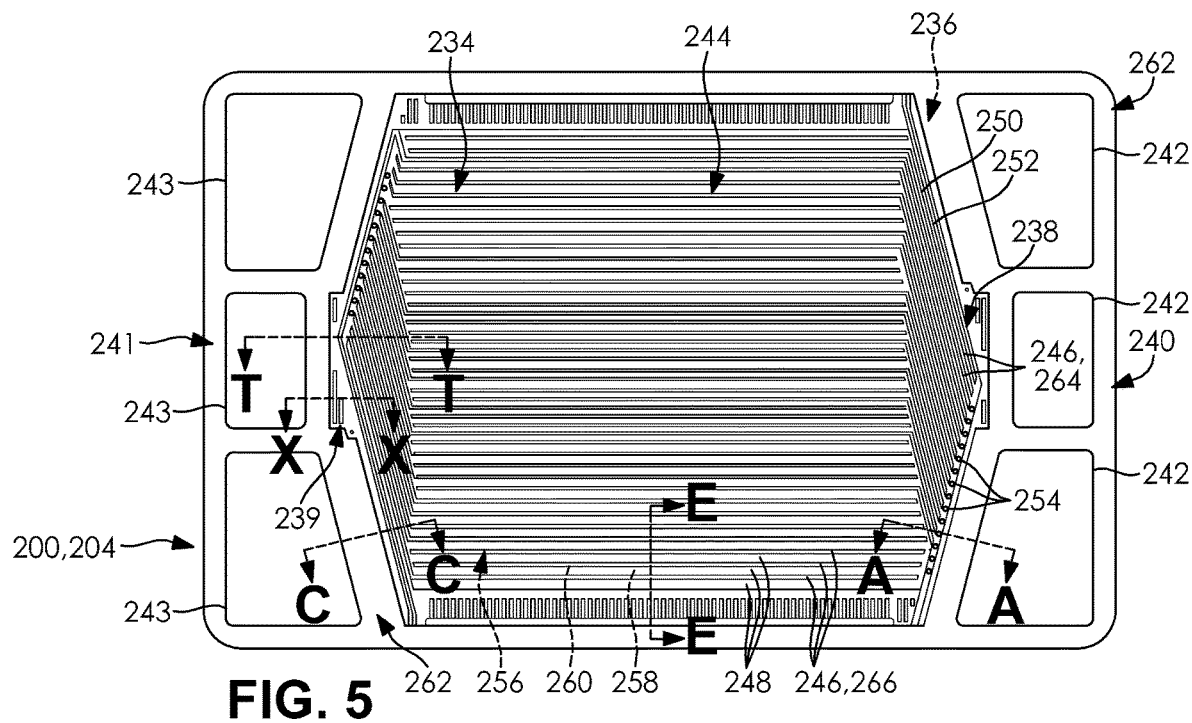
FIG. 5 is a top plan view of a stamped metal anode half plate for use in the bipolar plate assembly of FIG. 1.
Figure 6:
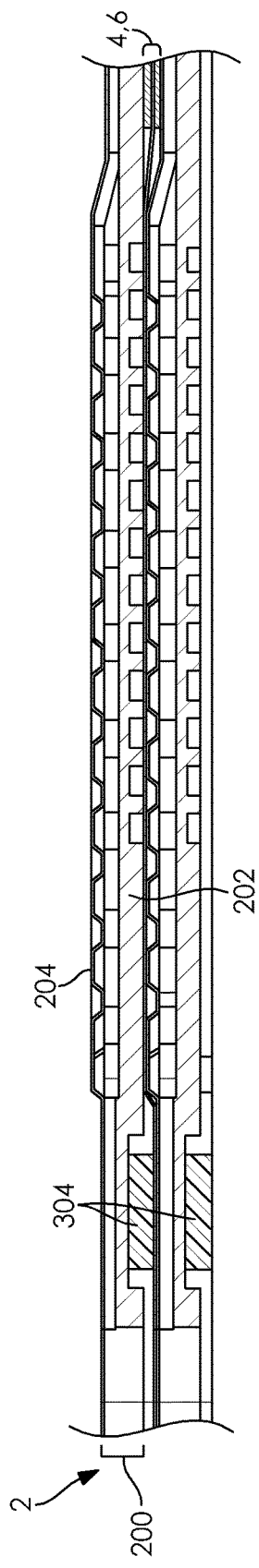
Figure 7:
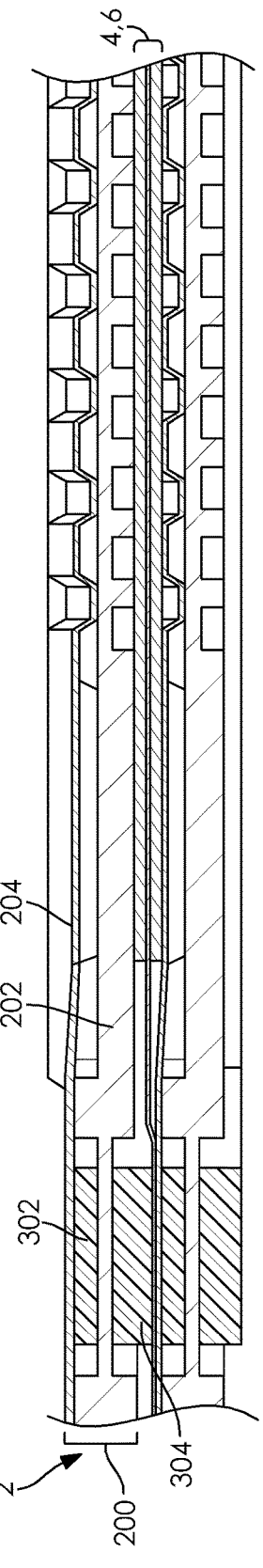
Figure 8:
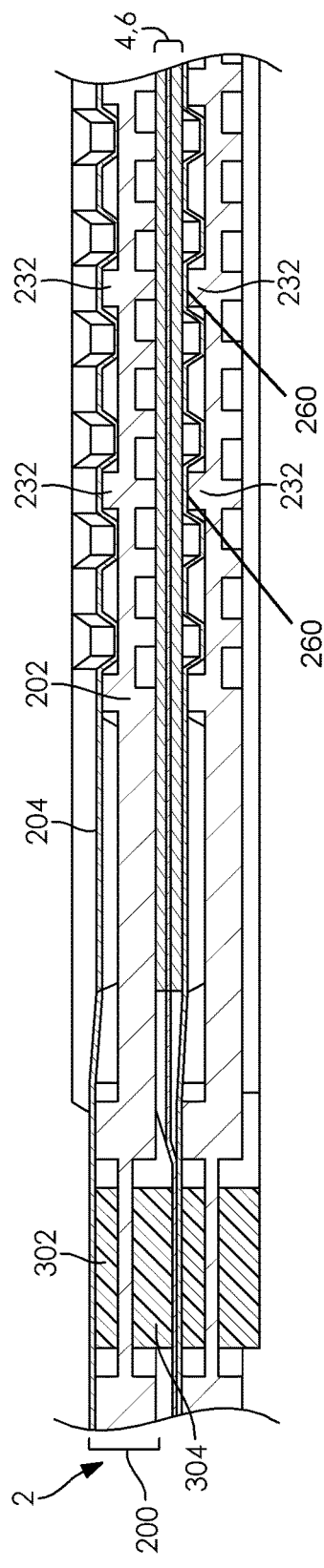
Figure 12:
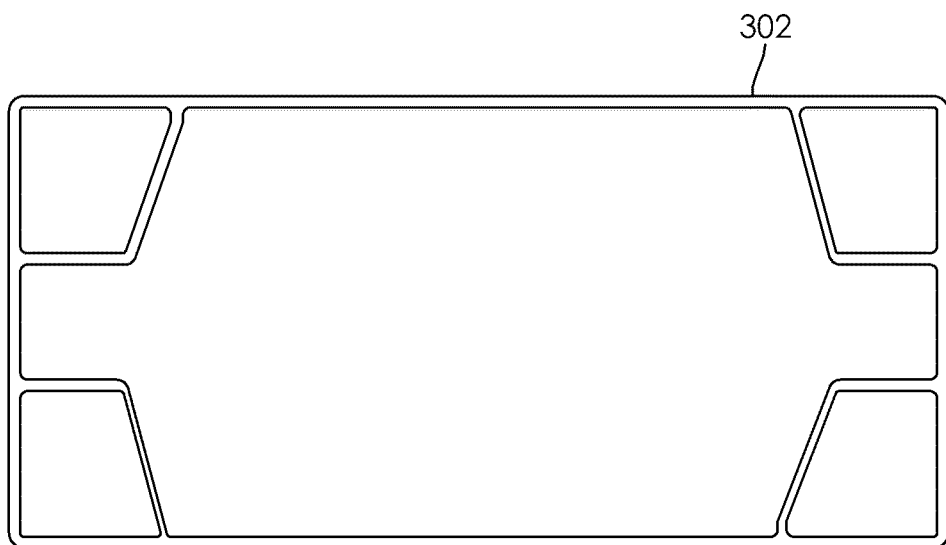
Figure 13:
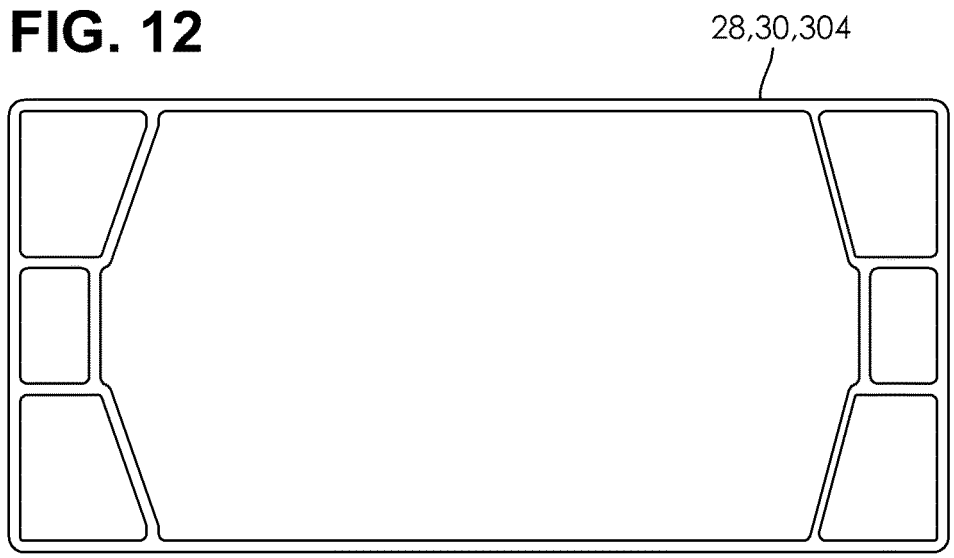
Figure 14:
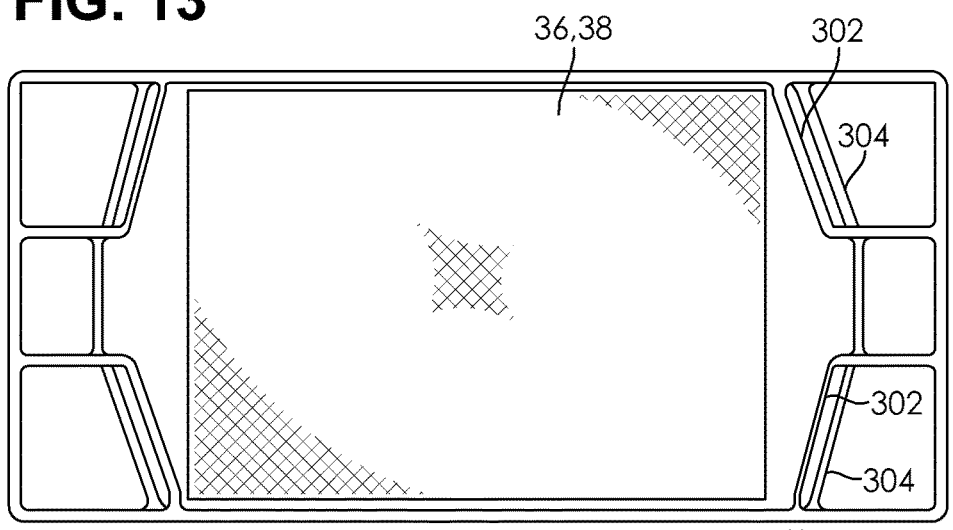

FIG. 6 is a fragmentary cross-sectional side elevational view of a fuel cell with an assembled bipolar plate assembly and taken along section line T-T of the anode half plate shown in FIG. 5, and with the anode half plate affixed to the cathode half plate shown in FIGS. 2 and 3 and assembled with a membrane electrode assembly (MEA), and further illustrating a long section view of a transition region of the fuel cell;

FIG. 7 is a fragmentary cross-sectional side elevational view of a fuel cell with an assembled bipolar plate assembly and taken along section line E-E of the anode half plate shown in FIG. 5, with the anode half plate affixed to the cathode half plate shown in FIGS. 2 and 3 and assembled with an MEA, and further illustrating an unsupported coolant region of the fuel cell;

FIG. 8 is a fragmentary cross-sectional side elevational view of a fuel cell with an assembled bipolar plate assembly and taken along section line E-E of the anode half plate shown in FIG. 5, with the anode half plate affixed to the cathode half plate shown in FIGS. 2 and 4 and assembled with an MEA, and further illustrating coolant channel support ribs of the fuel cell;

FIG. 9 is a fragmentary cross-sectional side elevational view of a fuel cell with an assembled bipolar plate assembly and taken along section line C-C of the anode half plate shown in FIG. 5, with the anode half plate affixed to the cathode half plate shown in FIGS. 2 and 3 and assembled with an MEA, and further illustrating cathode tunnels of the fuel cell;

FIG. 10 is a fragmentary cross-sectional side elevational view of a fuel cell with an assembled bipolar plate assembly and taken along section line A-A of the anode half plate shown in FIG. 5, the anode half plate affixed to the cathode half plate shown in FIGS. 2 and 3 and assembled with an MEA, and further illustrating anode tunnels of the fuel cell;

FIG. 11 is a fragmentary cross-sectional side elevational view of a fuel cell with an assembled bipolar plate assembly and taken along section line X-X of the anode half plate shown in FIG. 5, the anode half plate affixed to the cathode half plate shown in FIGS. 2 and 3 and assembled with an MEA, and further illustrating coolant tunnels of the fuel cell;

FIG. 12 is a top plan view of a plate seal for use with the fuel cell shown in FIGS. 1-11;

FIG. 13 is a top plan view of a membrane seal for use with the fuel cell shown in FIGS. 1-11; and FIG. 14 is a top plan view of the plate seal shown in FIG. 12 shown overlaid with the elastomeric membrane seal shown in FIG. 13 and a diffusion medium layer of the fuel cell, the plate seal shown without the half plate for purposes of illustrating a relative lateral positioning of the plate seal with the membrane seal.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

Figure 1:
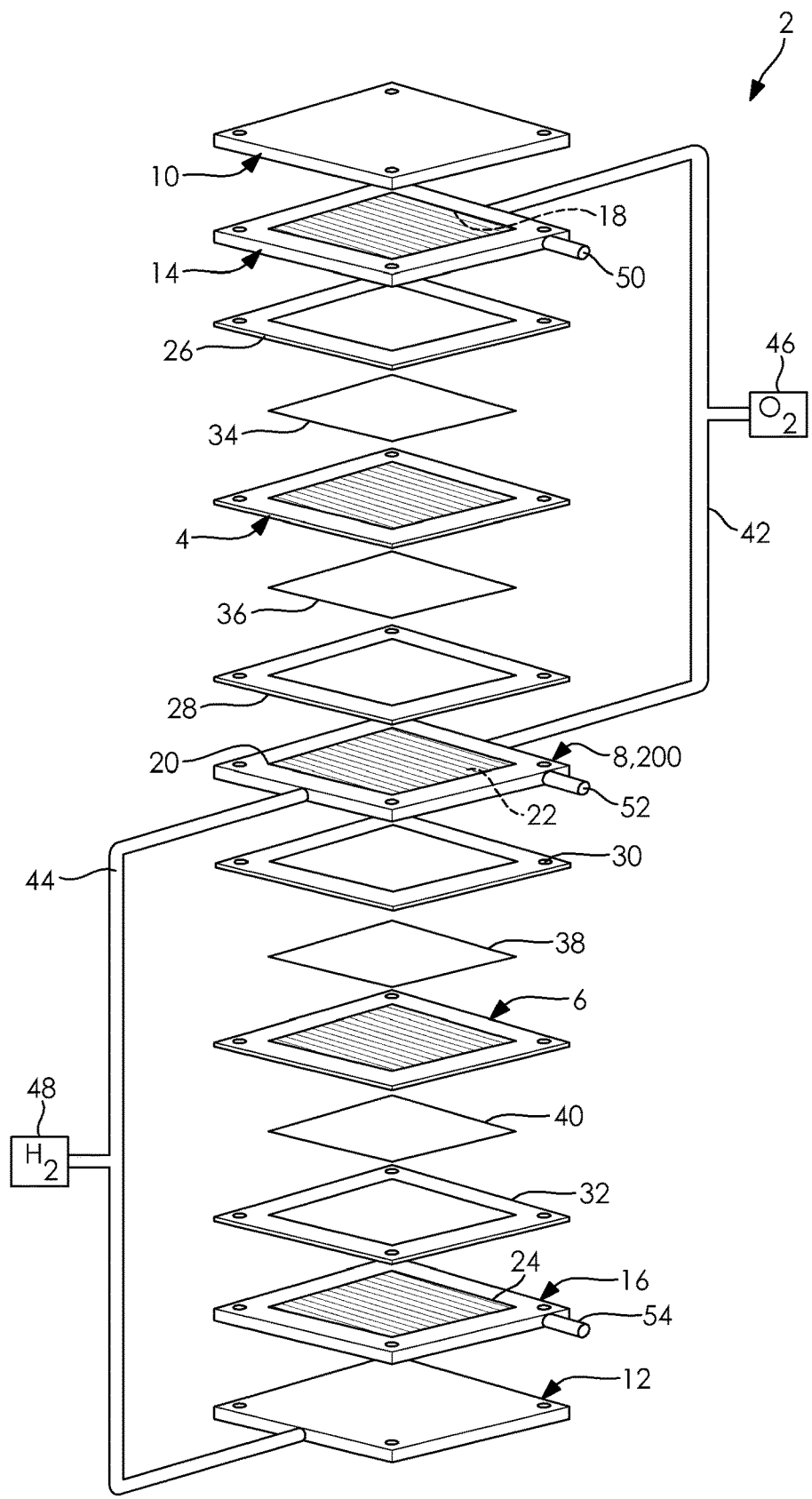
FIG. 1 illustrates a schematic, exploded perspective view of a PEM fuel cell stack, and shows only two cells with a single bipolar plate assembly for purpose of simplicity.

For simplicity, only a two-cell stack (i.e. one bipolar plate) is illustrated and described herein with respect to FIG. 1, it being understood that a typical stack will have many more such cells and bipolar plates.

FIG. 1 depicts a two cell PEM fuel cell stack 2 having a pair of membrane-electrode-assemblies (MEAs) 4, 6 separated from each other by an electrically conductive fluid distribution element 8, hereinafter also referred to as bipolar plate assembly 200. The MEAs 4, 6 include a membrane-electrolyte layer having an anode and a cathode with a catalyst on opposite faces of the membrane-electrolyte. The MEAs 4, 6 and bipolar plate assembly 8, 200 are stacked together between end plates 10, 12 and end contact elements 14, 16 under compression. The end contact elements 14,16 and the bipolar plate assembly 8, 200 include working faces 18, 20, 22, 24, respectively, for distributing fuel and oxidant gases (e.g., $H_2$ and Air or $O_2$) to the MEAs 4, 6. Nonconductive gaskets 26, 28, 30, 32 provide seals and electrical insulation between the several components of the fuel cell stack 2.

The MEAs 4, 6 are disposed adjacent gas permeable conductive materials known as gas diffusion media 34, 36, 38, 40. The gas diffusion media 34, 36, 38, 40 may include carbon or graphite diffusion paper. The gas diffusion media 34, 36, 38, 40 contact the MEAs 4, 6, with each of the anode and the cathode having an associated one of the diffusion medium layers. The end contact units 14, 16 contacts the gas diffusion media 34, 40 respectively. The bipolar plate assembly 8, 200 contacts the gas diffusion media 36 on the anode face of MEA 4, configured to accept hydrogen-bearing reactant, and also contacts gas diffusion medium 38 on the cathode face of MEA 6, configured to accept oxygen-bearing reactant. Oxygen is supplied to the cathode side of the fuel cell stack 2 from storage tank 46, for example, via an appropriate supply conduit 42. Hydrogen is supplied to the anode side of the fuel cell from a storage tank 48, for example, via an appropriate supply conduit 44. Alternatively, ambient air may be supplied to the cathode side as an oxygen source and hydrogen to the anode from a methanol or gasoline reformer, and the like. Exhaust conduits (not shown) for both the anode and cathode sides of the MEAs 4, 6 are also provided. Additional conduits 50, 52, 54 are provided for supplying liquid coolant to the bipolar plate assembly 8, 200 and end plates 14, 16. Appropriate conduits for exhausting coolant from the bipolar plate assembly 8, 200 and end plates 14, 16 are also provided (not shown).

Referring next to FIGS. 2-14, the bipolar plate assembly 200 is shown in greater detail. The bipolar plate assembly 200 includes a formed cathode half plate 202, for example, as shown in FIGS. 2-4, and a stamped metal anode half plate 204, for example, as shown in FIG. 5. In accordance with the teaching of the present disclosure, the formed cathode half plate 202 and the stamped metal anode half plate 204 are each formed from a different electrically conductive material, and according to different processes before being combined to form the bipolar plate assembly 200.

In particular, the formed cathode half plate 202 is formed from a composite material. The composite material may be suitable for a manufacturing process such as machining, molding, etching, cutting, or carving, as non-limiting examples. Suitable composite materials include, but are not limited to, graphite, graphite foil, conductive particles (e.g. graphite powders) in a polymer matrix, carbon fiber paper and polymer laminates, metal plates, polymer plates with metal cores, conductively coated polymer plates, and combinations thereof, for example.

The stamped metal anode half plate 204 is formed from a metallic material suitable for use in a manufacturing process such as stamping. Suitable metallic materials include, for example, pure metals and metal alloys. The pure metals and metal alloys have sufficient durability and rigidity to function as sheets in the bipolar plate assembly 8 of the fuel cell stack 2. Suitable metals and metal alloys include, but are not limited to, aluminum, titanium, platinum, stainless steel, carbon steel, nickel-based alloys, tantalum, niobium, and alloys and combinations thereof.

Additional design properties considered in selecting a material for the cathode and anode half plates 202, 204 include gas permeability, conductivity, density, thermal conductivity, corrosion resistance, pattern definition, thermal and pattern stability, machinability, joinability, and availability. With these considerations, one of ordinary skill in the art may also select other suitable materials for the formed cathode half plate 202 and the stamped metal anode half plate 204, as desired.

Each of the formed cathode half plate 202 and the stamped metal anode half plate 204 has an optimized thickness, with the stamped metal anode half plate 204 being relatively thinner in thickness relative to the formed cathode half plate 202. For example, the composite cathode half plate 202 may have a thickness of between about 0.3 mm and about 1 mm, more particularly between about 0.5 mm and about 0.75 mm, and most particularly about 0.65 mm. The stamped metal anode half plate 204 may have a thickness of between about 0.25 mm and about 0.55 mm, more particularly between about 0.35 mm and about 0.45 mm, and most particularly about 0.4 mm. One of ordinary skill in the art may also select other suitable thicknesses for the formed cathode plate 202 and the stamped metal anode half plate 204, as desired.

Being made from different materials, with the formed cathode half plate 202 being formed from a composite material not generally conducive to welding or brazing operations, it should be understood that the composite cathode half plate 202 and the stamped metal anode half plate 204 are affixed by other suitable means. Non-limiting examples of suitable means for affixing the half plates 202, 204 may include a compressed plate seal (shown in FIGS. 7-10 and 12 as "302") disposed between perimeter flanges of each of the half plates 202, 204. A compressed region of compliant graphite of the formed cathode half plate 202 itself, where the formed cathode half plate 202 is formed from graphite, may also be employed to plate seal 302 and affix the half plates 202, 204 to one another. Bonding of the formed cathode half plate 202 with the stamped metal anode half plate 204 may also be accomplished with epoxy in the perimeter flange regions of the half plates 202, 204, for example, as shown in FIGS. 7-10. One of ordinary skill in the art may also select other suitable means for affixing the formed cathode half plate 202 with the stamped metal anode half plate 204 within the scope of the present disclosure.

As shown in FIGS. 2-4, the formed cathode half plate 202 has a reactant side 206 (shown in FIG. 2) and a coolant side 208 (shown in FIGS. 3-4). The formed cathode half plate 202 further has a pair of feed regions 210, 211 and a pair of headers 212, 213 with a plurality of header apertures 214, 215. Although described primarily herewith with respect to a single one of the feed regions 210, a single one of headers 212, and a single set of header apertures 214 on one side of the formed cathode half plate 202, it should be appreciated that descriptions of features from the feed region 210, the header 212, and the header apertures 214 likewise apply to the other feed region 211, the other header 213, and the other header apertures 215 shown in FIGS. 2-4.

With reference to FIG. 2, the reactant side 206 of the formed cathode half plate 202 has an active area 216. The active area 216 having a plurality of cathode channels 218 formed therein. The cathode channels 218 are adapted to distribute the oxidant gases (e.g., air or oxygen) across the active area 216. The cathode channels 218 also define a plurality of lands 220 disposed therebetween.

The feed region 210 of the formed cathode half plate 202 is disposed between the active area 216 and the header 212. The feed region 210 has a plurality of feed channels 222 formed therein. The feed channels 222 also define a plurality of lands 224 disposed therebetween.

The feed region 210 of the formed cathode half plate 202 further has cathode port holes 226 formed therethrough, which are in turn in communication with a one of the header apertures 214 associated with the oxidant gases. The feed channels 222 are in communication with both the cathode channels 218 and the cathode port holes 226. The feed channels 222 are adapted to transport the oxidant gases between the active area 216 and the one of the header apertures 214 associated with the oxidant gases.

It should be appreciated that the cathode port holes 226 provide inlet and outlet passages in the form of tunnels for the fuel gases to flow through the bipolar plate assembly 200. A skilled artisan should understand that various configurations of the cathode channels 218, the feed channels 222, and the cathode port holes 226 may be used within the scope of the present disclosure. It should also be recognized that the present disclosure is not limited to a particular flow field pattern, but has application to bipolar plate assemblies 200 independent of the flow field pattern.

With reference to FIGS. 3-4, the coolant side 208 of the formed cathode half plate 202 has a coolant active area 228. The coolant active area 228 is disposed opposite the active area 216 of the same formed cathode half plate 202. The coolant side 208 further has support features 230, 232. The support features 230, 232 are disposed opposite at least one of the feed region 210, 211 and the active area 216 of the same formed cathode half plate 202.

In should be understood that at least a portion of the coolant active area 228 of the formed cathode half plate 202 is different from, and is not constrained to correspond with, the cathode channels 218 of the active area 216. This is facilitated by the formation of the formed cathode half plate 202 by molding or cutting manufacturing methods, which are different from stamping operations, and which stamping operations are otherwise known to provide lands on one side of the plate corresponding with channels on the other side of the plate, and vice-versa.

Advantageously, the employment of different structure in the coolant active area 228 relative to the active area 216 is believed to allow for an optimization or maximization of current density for the bipolar plate assembly 200 of the present disclosure. In particular, desirable current density has been found where the cathode channels 218 are provided with a pitch (where the term "pitch" is defined as a sum of the channel width and the land width) of about 1.5 mm or less. In a most particular embodiment, the cathode channels 218 may have a pitch of about 1 mm.

The very fine pitch for the cathode channels 218 of the present disclosure is believed to provide for superior current densities compared to conventional stamped metal bipolar plates. One of ordinary skill in the art may also select other suitable relative pitches for the cathode channels 218 of the reactant side 206 and the coolant active area 228 of the coolant side 208, as desired.

As nonlimiting examples, as shown in FIGS. 3-4, the support features 230 in the coolant distribution area 210, 211 of the formed cathode half plate 202 may include a plurality of pillars 230 or other support structures that permit the passage of coolant flow. The plurality of pillars 230 may extend outwardly from the coolant side of the formed cathode half plate 202. As shown in FIGS. 3-4, the pillars 230 are disposed opposite only the feed regions 210, 211 of the formed cathode half plate 202, and are not otherwise disposed opposite the active area 216 of the formed cathode half plate 202. The pillars 230 may also be spaced apart from one another and arranged in an array or matrix or other patterns that permit the passage of coolant flow. For example, the pillars 230 may be disposed every 3 mm (3 mm×3 mm array with the pillars 230 generally arranged in rows and columns). Similar arrays may be provided with other distributions, for example 1 mm×1 mm arrays, 2 mm×2 mm arrays, and 5 mm×5 mm arrays, for example. It should be understood that other arrangements and distributions of the pillars 230 may be employed by a skilled artisan.

In illustrative embodiments of the present disclosure, each of the plurality of pillars 230 may have an average diameter of less than about 0.2 mm. In further embodiments, the plurality of pillars 230 have an average diameter of less than about 1 mm. In particular embodiments, each of the pillars 230 may have an average diameter of less than about 0.5 mm. Other dimensions for the pillars 230 may also be employed, as desired.

Regardless of arrangement, configuration, or dimensions, it should be appreciated that the pillars 230 are adapted to abut and support the adjacent stamped metal anode half plate 204 that is nested with the formed cathode half plate 202, for example, as shown in FIGS. 6-11. Thus, a height, width, and general shape of each of the pillars 230 may be selected by one skilled in the art depending on the desired nested dimensions of the formed cathode half plate 202 with the stamped metal anode half plate 204. The pillars 230 thereby facilitate a distribution of coolant from an associated one of the header apertures 214 to the coolant distribution area 228, even while the bipolar plate assembly 200 is under compression typical with operation of the fuel cell stack 2.

With reference to FIG. 4, the support features 230, 232 on the coolant side 208 of the formed cathode half plate 202 may also include a plurality of support ribs 232. The support ribs 232 are disposed only in the coolant distribution area 228 opposite the active area 216 of the formed cathode half plate 202. In particular, the support ribs 232 may be spaced apart from, and oriented generally parallel with, one another on the coolant distribution area 228. The support ribs 232 are elongate and may be oriented along a length of the coolant distribution area 228 between the headers 212, 214 of the formed cathode half plate 202. The support ribs 232 may also be substantially linear in shape. However, a skilled artisan may also select other suitable shapes and distributions of the support ribs 232, as desired.

It should be understood that the support ribs 232 on the coolant side 208 of the formed cathode half plate 202 may furthermore allow for the use of thinner metal gauges, such as typical foil gauges, for the stamped metal anode half plate 204 of the present disclosure. In particular, the support ribs 232 may be configured to interact with and support an opposing surface of the stamped metal anode plate 204 as described further herein.

As shown in FIG. 5, the stamped metal anode half plate 204 of the present disclosure is configured to be nested with and affixed to the formed cathode half plate 202. The stamped metal anode half plate 204 has a fuel side 234 and a coolant side 236. The stamped metal anode half plate 204 further has a pair of feed regions 238, 239 and a pair of headers 240, 241 with a plurality of header apertures 242, 243. Although described primarily herewith with respect to a single one of the feed regions 238, a single one of headers 240, and a single set of header apertures 242 on one side of the stamped metal anode half plate 204, it should be appreciated that descriptions of features from the feed region 238, the header 240, and the header apertures 242 likewise apply to the other feed region 239, the other header 241, and the other header apertures 243.

Being formed by a stamping operation on a thin metal sheet or foil, it should be understood that the stamped features (e.g., the channels and lands) on the fuel side 234 of the stamped metal anode half plate 204 will have corresponding but opposite features (e.g., lands and channels, respectively) with otherwise the same or similar dimensions on the coolant side 236 of the stamped metal anode half plate 204.

The fuel side 234 of the stamped metal anode half plate 204 has an active area 244. The active area 244 has a plurality of anode channels 246 formed therein. The anode channels 246 are adapted to distribute the fuel gases (e.g., hydrogen) across the active area 244. The anode channels 246 also define a plurality of lands 248 disposed therebetween.

The feed region 238 of the stamped metal anode half plate 204 is disposed between the active area 244 and the header 240. The feed region 238 has a plurality of feed channels 250 formed therein. The feed channels 250 also define a plurality of lands 252 disposed therebetween.

The feed region 238 further has anode port holes 254 formed therethrough, which are in turn in communication with a one of the header apertures 242 associated with the fuel gases. The feed channels 250 are in communication with both the anode channels 246 and the anode port holes 254. The feed channels 250 are adapted to transport the fuel gases between the active area 244 and the one of the header apertures 242 associated with the fuel gases.

It should be appreciated that the anode port holes 254 provide inlet and outlet passages in the form of tunnels for the fuel gases to flow through the bipolar plate assembly 200. A skilled artisan should understand that various configurations of the anode channels 246, the feed channels 250, and the anode port holes 254 may be used within the scope of the present disclosure. It should also be recognized that the present disclosure is not limited to a particular flow field pattern, but has application to bipolar plate assemblies 200 independent of the flow field pattern.

As discussed hereinabove, the coolant side 236 of the stamped metal anode half plate 204 has a plurality of lands 258 corresponding with the anode channels 246. In turn, the lands 258 define a plurality of coolant channels 260 on the coolant side 236 of the stamped metal anode half plate 204. The plurality of lands 258 abut the coolant side 208 of the formed cathode half plate 202 upon assembly, for example, as shown in FIGS. 6-11.

With reference to FIG. 8, where the formed cathode half plate 202 has the support ribs 232 on the coolant side 208, the support ribs 232 may be aligned with every other one of the coolant channels 260 on the coolant side 236 of the stamped metal anode half plate 204. It should be appreciated that the support ribs 232 in such an arrangement provide for sufficient support of the stamped metal anode half plate 204 while also permitting for a sufficient amount of the coolant channels 260 to remain open for transfer of the coolant therethrough. Other arrangements for the support ribs 232, including embodiments without any support ribs 232 and instead just an empty pocket, are also contemplated and considered to be within the scope of the present disclosure.

With renewed reference to FIG. 5, the stamped metal anode half plate 204 a flat or planar perimeter flange 262. The planar perimeter flange 262 defines at least part of a sealing region of the stamped metal anode half plate 204 that is configured to abut and seal with a seal combination 300 of the fuel cell stack 2 including a plate seal 302 and a membrane seal 304, for example, as shown in FIGS. 12-14.

It should further be understood that the plurality of anode channels 246 formed in the stamped metal anode half plate 204 includes a plurality of branched feed channels 264 in the feed region 238 of the stamped metal anode half plate 204. The anode channels 246 may also include a plurality of linear anode channels 266 in the active area 244. The linear anode channels 266 may be oriented along the active area 244 of the stamped metal anode half plate 204. A skilled artisan will appreciate that the linear shape of the anode channels 266 may advantageously facilitate a cooperation of the opposing coolant channels 260 with the support ribs 232 where also linear in shape, as described hereinabove. However, although the anode channels 266 in the active area 244 are shown in FIG. 5 as being linear between the feed regions 238, 239, one of ordinary skill in the art may select other suitable configures for the anode channels 266 in the active area 244 of the stamped metal anode half plate 204, as desired.

With respect to the active areas 216, 244 of the bipolar plate assembly 200, it should be appreciated that at least one of the active areas 216, 244 may be have a coating (not shown). The coating may be adapted to provide corrosion resistance, thermal conductivity, and optimized electrical conductivity and contact resistance, for example. In embodiments where the active areas 216, 244 are coated, the coating may facilitate electrical conductivity.

As nonlimiting example, the coating may include noble metals, metal oxides, carbon and combinations thereof. Suitable noble metals for coatings include gold (Au), silver (Ag), iridium (Ir), ruthenium (Ru), rhodium (Rh), osmium (Os), palladium (Pd) and platinum (Pt), for example. In particular embodiments, the metal employed for the coating of the active areas 216, 244 is gold (Au). Suitable metal oxides for the coating, but are not limited to, hafnium dioxide ($HfO_2$), zirconium dioxide ($ZrO_2$), aluminum oxide ($Al_2O_3$), tin oxide ($SnO_2$), tantalum pent-oxide ($Ta_2O_5$), niobium pent-oxide ($Nb_2O_5$), molybdenum dioxide ($MoO_2$), iridium dioxide ($IrO_2$), ruthenium dioxide ($RuO_2$) and mixtures thereof. The coatings are typically applied using any commercially available process. As nonlimiting examples, the coatings may be applied by one of electroplating, electro-less plating, and physical vapor deposition. It should be understood that other suitable methods for applying the coatings may be used as desired.

In particular embodiments, the coating may be hydrophilic and adapted to facilitate a removal of liquid water from the active areas 216, 244 during operation of the fuel cell stack 2. Suitable hydrophilic coatings may include the noble metal coatings as described herein and as known in the art. As nonlimiting examples, the coating can include at least one Si—O group, at least one polar group and at least one group including a saturated or unsaturated carbon chain. In further embodiments the coating comprises at least one Si—O group and an Si—R group, wherein R includes a saturated or unsaturated carbon chain and the molar ratio of Si—R groups to Si—O groups ranges from ⅛ to ½. The coating may also be applied by any means sufficient for applying hydrophilic coatings. Suitable hydrophilic coatings can also include nanoparticles having a size ranging from 1 to 100 nanometers, wherein the nanoparticles comprise a compound comprising a Si—O group, a saturated or unsaturated carbon chain and a polar group. It should be appreciated that other hydrophilic coatings can also be used.

The hydrophilic coatings may be applied by any suitable method including, but not limited to, laminating (such as by hot rolling), brushing, spraying, spreading, coil coating, silk screening, powder coating, and screen printing. Multiple coats of the coating may also be applied as desired.

In operation, and as described further hereinabove with respect to FIG. 1, the hybrid bipolar plate assembly 200 of the present disclosure is employed in the fuel cell stack 2. The fuel cell stack 2 may include a plurality of the MEAs 4, 6 arranged in a stacked configuration. In addition to a plurality of the bipolar plate assembly 200 and the MEAs 4, 6 described hereinabove, the fuel cell stack 2 may further have nonconductive gaskets 28, 30 in the form of a membrane seal 304, for example, as shown in FIGS. 13-14.

In a particular example, shown in FIGS. 12-14, a seal combination 300 of the fuel cell stack 2 may include a plate seal 302. The plate seal 302 is adapted to hermetically seal or affix the formed cathode half plate 202 with the stamped metal anode half plate 204, for example, as shown in FIGS. 6-10. The plate seal 302 may be formed from one of an elastomer, a compressible graphite, and an epoxy material, as non-limiting examples, as also described hereinabove. Other suitable materials and methods for forming the plate seal 302 may also be employed within the scope of the disclosure.

In particular, the plate seal 302 is configured to be disposed around the perimeter of the bipolar plate assembly 200, including bipolar plate headers that are defined by the header apertures header apertures 214, 215, 242, 243. However, as shown in FIG. 12, the plate seal 302 is not disposed adjacent an inboard portion of the header apertures 214, 215, 242, 243 associated with the coolant distribution. It should be appreciated that the absence of the plate seal 302 adjacent the inboard portion these header apertures 214, 215, 242, 243 permits for the distribution of the coolant to the interior coolant distribution area of the bipolar plate assembly 200 in operation.

The seal combination 300 of the fuel cell stack 2 further includes a membrane seal 304, for example, as shown in FIG. 13. The membrane seal 304 is disposed between the bipolar plate 200 and the MEA 4, 6. In particular, the membrane seal 304 is formed from an elastomer and disposed around a perimeter of the bipolar plate assembly 200 and each of the header apertures 214, 215, 242, 243. However, the membrane seal 304 is also configured to be disposed around the header apertures 214, 215, 242, 243 associated with the coolant distribution, as shown in FIG. 13. The membrane seal 304 thereby militates against a leakage of coolant into the active areas of the fuel cell stack 2.

As shown in FIG. 14, it should be appreciated that the membrane seal 304 is generally overlaid with the plate seal 302 when each are present in the fuel cell stack 2, and that the seals 302, 304 together circumscribe one of the diffusion medium layers 36, 38. In addition the diffusion medium layers 36, 38 are of a predetermined size such that a perimeter edge of the one of the diffusion medium layers 36, 38 is laterally spaced apart from each of the membrane seal 304 and the plate seal 302. This advantageously allows spaced for the stamped channels to un-nest in that region between the perimeter edge of the diffusion medium layers 36, 38 and the seal combination 300.

Advantageously, as shown in FIGS. 9-10 and 14, the plate seal 302 may be offset from the membrane seal 304 in an inboard direction in front of at least one of the anode and cathode header apertures 214, 215, 242, 243 by a distance G. The width of the plate seal 302 at this location may also be narrower than the width of a corresponding portion of the membrane seal 304 at this location. For example, the width of the plate seal 302 may be about one-half (½) the width of the membrane seal. This permits for a smaller overall construction of the fuel cell stack 2, while also permitting tunnel flow to at least one of the cathode and anode port holes in operation. Likewise, a width of the plate seal 302 may be narrower in front of the anode header to allow tunnel flow to access the anode ports.

The cooperation of the hybrid bipolar plate assembly 200 with one of the MEAs 4, 6 is further illustrated in FIGS. 6-11, which are cross-sectional views of an exemplary fuel cell stack 2 taken various section lines shown in FIG. 5.

In FIGS. 6-8, the stamped metal anode half plate 204 is illustrated having a flat perimeter in the sealing region. The stamped metal half plate 204 also has the branched feed channels and the straight channels through the active area with an elevation change from the feed region to active area channels to nest into the back of the formed cathode half plate 202. This in turn causes the lands on the coolant side of the stamped metal anode half plate 204 to abut and nest into the coolant side of the formed cathode half plate 202.

In particular, in FIG. 6, a long section view of a transition between the feed region and the active area of the fuel cell stack 2 is shown. In FIG. 7, a cross section view of the fuel cell stack 2 in the active area is shown, where the formed cathode half plate 202 is the embodiment shown in FIG. 3 without the support ribs 232. In FIG. 8, a cross section view of the fuel cell stack 2 in the active area is shown, where the formed cathode half plate 202 is the embodiment shown in FIG. 4 with the support ribs 232.

In FIGS. 9-11, section view of the cathode, anode, and coolant tunnels and associated features for these regions are shown. The tunnels are between the cathode and anode half plates 202, 204 for all three fluids. The cathode has port holes in the formed cathode half plate 202 after the membrane seal into the start of the cathode feed channels. The anode has port holes in the stamped anode half plate 204 after the membrane seal into the start of the anode feed channels. The coolant tunnels continue between the two half plates 202, 204 into the coolant feed region. The bead feature (i.e., the rib on the coolant side 236 of anode half plate 204) along the plate seal 302 can be observed in the cathode and anode tunnel sections shown in FIGS. 9 and 10. The coolant tunnel sections are shown in FIG. 11.

It should be appreciated that the bipolar plate assembly 200 of the present disclosure, having the stamped metal anode half plate 204 nested into the formed cathode half plate 202, advantageously provides tunnel features in the formed cathode half plate 202. As disclosed hereinabove, sealing between the formed cathode half plate 202 and the stamped metal anode half plate 204 is provided by a) a compressed elastomeric plate seal 302, b) a compressed region of compliant graphite of the formed cathode half plate 202 itself, which forms the plate seal 302 and c) bonding of the metal of the stamped metal anode half plate 204 and the formed cathode half plate 202 with epoxy in the same region to form the plate seal 302.

Advantageously, the bipolar plate assembly 200 of the present facilitates a reduced fuel cell thickness compared to fuel cells manufactured with conventional formed bipolar plates. Improved performance with fine pitch cathode channels are obtained, however, with the bipolar plate assembly 200 of the present disclosure. Minimized thermal mass with reduced coolant volume is also obtainable compared to conventional fully stamped metal plates. This can be further reduced with use of the coolant channel support ribs, particularly where compared to conventional nested metal half plates. The bipolar plate assembly 200 also may be manufactured at a reduced cost and mass with thinner metal for the stamped metal anode half plate being enabled by the coolant channel support ribs from the coolant side of the formed cathode half plate.

While certain representative embodiments and details have been shown for purposes of illustrating the invention, it will be apparent to those skilled in the art that various changes may be made without departing from the scope of the disclosure, which is further described in the following appended claims.

What is claimed is:

1. A hybrid bipolar plate assembly for a fuel cell, comprising:
   a formed cathode half plate having a reactant side and a coolant side, a feed region, and a header with a plurality of header apertures, the reactant side having an active area, the active area having a plurality of cathode channels forming a channel pattern on the reactant side, a negative image of the channel pattern not found on the coolant side, the feed region disposed between the active area and the header and having a plurality of feed channels formed therein and cathode port holes formed therethrough, the feed channels in communication with the cathode channels and the cathode port holes, the coolant side having a coolant distribution area disposed opposite the active area and support features disposed opposite at least one of the feed region and the active area, the support features on the coolant side of the formed cathode half plate including a plurality of pillars, each pillar having a circular cross section and extending outwardly from the coolant side of the formed cathode half plate, and at least a portion of the coolant distribution area being different from and not corresponding with the cathode flow channels of the active area, wherein the formed cathode half plate is not a stamped half plate; and
   a stamped metal anode half plate affixed to the formed cathode half plate, the stamped metal anode half plate having a fuel side and a coolant side, a feed region, and a header with a plurality of header apertures, the fuel side having an active area, the active area having a plurality of anode channels formed therein, the feed region disposed between the active area and the header and having a plurality of feed channels formed therein and anode port holes formed therethrough, the feed channels in communication with the anode channels and the anode port holes, the coolant side having a plurality of lands corresponding with the anode channels, the lands defining a plurality of coolant channels on the coolant side of the stamped metal anode half plate, the plurality of lands abutting the coolant side of the formed cathode half plate.

2. The hybrid bipolar plate assembly of claim 1, wherein the cathode channels have a pitch of 1.5 mm or less.

3. The hybrid bipolar plate assembly of claim 2, wherein the cathode channels have a pitch of 1 mm.

4. The hybrid bipolar plate assembly of claim 1, wherein the pillars are spaced apart from one another and arranged in an array.

5. The hybrid bipolar plate assembly of claim 1, wherein the support features on the coolant side of the formed cathode half plate include a plurality of support ribs disposed in the coolant distribution area.

6. The hybrid bipolar plate assembly of claim 5, wherein the support ribs are spaced apart from and parallel with one another, and the support ribs are oriented along a length of the coolant distribution area.

7. The hybrid bipolar plate assembly of claim 6, wherein the support ribs are aligned with every other one of the coolant channels on the coolant side of the stamped metal anode half plate.

8. The hybrid bipolar plate assembly of claim 1, wherein the stamped metal anode half plate has a sealing region with a planar perimeter flange.

9. The hybrid bipolar plate assembly of claim 8, wherein the stamped metal anode half plate has a bead feature disposed in the sealing region adjacent to at least one of an anode header aperture and a cathode header aperture.

10. The hybrid bipolar plate assembly of claim 1, wherein the plurality of anode channels formed in the stamped metal anode half plate includes a plurality of branched feed channels in the feed region of the stamped metal anode half plate and a plurality of linear flow channels oriented along the active area of the stamped metal anode half plate.

11. The hybrid bipolar plate assembly of claim 10, wherein there is an elevation change from the branched feed channels in the feed region to the linear flow channels in the active area to cause the lands on the coolant side of the stamped metal anode half plate to abut the coolant side of the formed cathode half plate.

12. The hybrid bipolar plate assembly of claim 1, wherein the formed cathode half plate is formed from graphite and the stamped metal anode half plate is formed from stainless steel.

13. The hybrid bipolar plate assembly of claim 1, wherein the formed cathode half plate has a thickness of between 0.3 mm and 1 mm.

14. The hybrid bipolar plate assembly of claim 13, wherein the stamped metal anode half plate has a thickness of between 0.25 mm and 0.55 mm.

15. A hybrid bipolar plate assembly for a fuel cell, comprising:
   a formed cathode half plate having a reactant side and a coolant side, a feed region, and a header with a plurality of header apertures, the reactant side having an active area, the active area having a plurality of cathode channels forming a channel pattern on the reactant side, a negative image of the channel pattern not found on the coolant side, the feed region disposed between the active area and the header and having a plurality of feed channels formed therein and cathode port holes formed therethrough, the feed channels in communication with the cathode channels and the cathode port holes, the coolant side having a coolant distribution area disposed opposite the active area and support features disposed opposite at least one of the feed region and the active area, the support features on the coolant side of the formed cathode half plate including a plurality of pillars, each pillar having a circular cross section and extending outwardly from the coolant side of the formed cathode half plate, and at least a portion of the coolant distribution area being different from and not corresponding with the cathode flow channels of the active area, wherein the formed cathode half plate is not a stamped half plate; and a stamped metal anode half plate affixed to the formed cathode half plate, the stamped metal anode half plate having a fuel side and a coolant side, a feed region, and a header with a plurality of header apertures, the fuel side having an active area, the active area having a plurality of anode channels formed therein, the feed region disposed between the active area and the header and having a plurality of feed channels formed therein and anode port holes formed therethrough, the feed channels in communication with the anode channels and the anode port holes, the coolant side having a plurality of lands corresponding with the anode channels, the lands defining a plurality of coolant channels on the coolant side of the stamped metal anode half plate, the plurality of lands abutting the coolant side of the formed cathode half plate, wherein the stamped metal anode half plate has a sealing region with a planar perimeter flange, wherein the plurality of anode channels formed in the stamped metal anode half plate includes a plurality of branched feed channels in the feed region of the stamped metal anode half plate and a plurality of linear flow channels oriented along the active area of the stamped metal anode half plate, wherein the stamped metal anode half plate has a thickness of between 0.25 mm and 0.55 mm, and wherein the stamped metal anode half plate is formed from stainless steel; and a plate seal disposed between and sealing the formed cathode half plate with the stamped metal anode half plate, wherein the plate seal is formed from one of an elastomer, a compressible graphite, and an epoxy material, and is also disposed around a perimeter of each of the formed cathode half plate and the stamped metal anode half plate.

16. A fuel cell stack comprising:

a plurality of membrane electrode assemblies arranged in a stacked configuration, each of the membrane electrode assemblies having a polymer electrolyte membrane with a cathode and an anode and associated diffusion medium layers; and a hybrid bipolar plate assembly disposed between adjacent membrane electrode assemblies, the hybrid bipolar plate assembly including a formed cathode half plate, wherein the formed cathode half plate is not a stamped half plate, and a stamped metal anode half plate, the stamped metal anode half plate affixed to the formed cathode half plate, the formed cathode half plate having a reactant side and a coolant side, a feed region, and a header with a plurality of header apertures, the reactant side having an active area, the active area having a plurality of cathode channels forming a channel pattern on the reactant side, a negative image of the channel pattern not found on the coolant side, the feed region disposed between the active area and the header and having a plurality of feed channels formed therein and cathode port holes formed therethrough, the feed channels in communication with the cathode channels and the cathode port holes, the coolant side having a coolant distribution area disposed opposite the active area and support features disposed opposite at least one of the feed region and the active area, the support features on the coolant side of the formed cathode half plate including a plurality of pillars, each pillar having a circular cross section and extending outwardly from the coolant side of the formed cathode half plate, and at least a portion of the coolant distribution area being different from and not corresponding with the cathode flow channels of the active area, and the stamped metal anode half plate affixed to the formed cathode half plate, the stamped metal anode half plate having a fuel side and a coolant side, a feed region, and a header with a plurality of header apertures, the fuel side having an active area, the active area having a plurality of anode channels formed therein, the feed region disposed between the active area and the header and having a plurality of feed channels formed therein and anode port holes formed therethrough, the feed channels in communication with the anode channels and the anode port holes, the coolant side having a plurality of lands corresponding with the anode channels, the lands defining a plurality of coolant channels on the coolant side of the stamped metal anode half plate, the plurality of lands abutting the coolant side of the formed cathode half plate.

17. The fuel cell stack of claim 16, wherein each of the membrane electrode assemblies includes a membrane seal and the bipolar plate assembly includes a plate seal, the plate seal disposed between and sealing the formed cathode half plate with the stamped metal anode half plate, the membrane seal and the plate seal both circumscribing one of the diffusion medium layers, a perimeter edge of the one of the diffusion medium layers spaced apart from each of the membrane seal and the plate seal.

18. The fuel cell stack of claim 17, wherein the membrane seal is formed from an elastomer and disposed around a perimeter of the bipolar plate assembly and each of the header apertures, the membrane seal abutting and sealing with one of the polymer electrolyte membranes.

19. The fuel cell stack of claim 18, wherein the plate seal is formed from one of an elastomer, a compressible graphite, and an epoxy material, and is also disposed around the perimeter of the bipolar plate assembly, and a portion of the plate seal adjacent one of the header apertures for the anode is narrower than a corresponding portion of the membrane seal adjacent the one of the header apertures for the anode, whereby tunnel flow to the anode port holes is permitted.

20. The hybrid bipolar plate assembly of claim 1, wherein the plurality of pillars is arranged in rows and columns, and one of the rows and columns includes a greater number of pillars relative to another one of the rows and columns.

* * * * *